US012611971B2

(12) United States Patent
Mindel et al.

(10) Patent No.: US 12,611,971 B2
(45) Date of Patent: Apr. 28, 2026

(54) CAR SEAT WITH OBSTRUCTING ELEMENT

(71) Applicant: BabyArk LTD, Hevel Modiln Industrial Park (IL)

(72) Inventors: Shy Mindel, Hod-HaSharon (IL); Alexandr Polischuk, Beer Sheva (IL)

(73) Assignee: BabyArk LTD, Hevel Modiin Industrial Park (IL)

( * ) Notice: Subject to any disclaimer, the term of this patent is extended or adjusted under 35 U.S.C. 154(b) by 167 days.

(21) Appl. No.: 18/386,695

(22) Filed: Nov. 3, 2023

(65) Prior Publication Data

US 2024/0149756 A1 May 9, 2024

Related U.S. Application Data

(60) Provisional application No. 63/422,458, filed on Nov. 4, 2022.

(51) Int. Cl.
*B60N 2/28* (2006.01)
*B60N 2/005* (2006.01)
*B60N 2/90* (2018.01)

(52) U.S. Cl.
CPC .............. *B60N 2/28* (2013.01); *B60N 2/005* (2013.01); *B60N 2/2821* (2013.01); *B60N 2/919* (2018.02)

(58) Field of Classification Search
CPC ........ B60N 2/005; B60N 2/28; B60N 2/2821; B60N 2/919
USPC ...................................................... 297/250.1
See application file for complete search history.

(56) References Cited

U.S. PATENT DOCUMENTS

| | | | | |
|---|---|---|---|---|
| 4,915,446 A * | 4/1990 | Darling | ................ | B60N 2/2821 297/256.16 |
| 5,286,086 A * | 2/1994 | Gunji | ................... | B60N 2/2806 297/250.1 |
| 5,611,596 A * | 3/1997 | Barley | ................ | B60N 2/2812 297/256.13 X |
| 6,508,510 B2 * | 1/2003 | Yamazaki | .............. | B60N 2/286 297/250.1 |
| 6,672,664 B2 * | 1/2004 | Yanaka | ................. | B60N 2/286 297/256.16 |
| 7,926,874 B2 * | 4/2011 | Hendry | ................ | B60N 2/2845 297/256.16 |
| 8,070,228 B2 * | 12/2011 | Karremans | .......... | B60N 2/2821 297/256.16 |
| 8,262,161 B2 * | 9/2012 | Fritz | .................... | B60N 2/2863 297/256.16 |
| 8,550,555 B2 * | 10/2013 | Fritz | ................... | B60N 2/2816 297/256.16 |

(Continued)

*Primary Examiner* — Rodney B White

(57) ABSTRACT

A car seat comprising a seat shell formed around at least part of a seating space, a seat securing mechanism adapted to secure the seat shell to the docking device in a secure state and release the seat shell from the docking device in a release state, and a rotation control mechanism mechanically synchronized with the seat securing mechanism and to an obstructing element. The rotation control mechanism prevents rotating the obstructing element between an obstructing state and a non-obstructing state when the seat securing mechanism is not in the secure state. In the obstructing state the obstructing element protrudes into the seating space for obstructing seating of an infant and in the non-obstructing state the obstructing element is angled towards a surface of the seat shell.

19 Claims, 13 Drawing Sheets

(56)         References Cited

U.S. PATENT DOCUMENTS

| | | | | |
|---|---|---|---|---|
| 8,690,244 | B2 * | 4/2014 | Fritz | B60N 2/265 |
| | | | | 297/256.16 |
| 9,308,838 | B2 * | 4/2016 | Miller | B60N 2/2821 |
| 9,499,074 | B2 * | 11/2016 | Strong | B60N 2/286 |
| 9,586,504 | B2 * | 3/2017 | Strong | B60N 2/2806 |
| 9,937,823 | B2 * | 4/2018 | Williams | B60N 2/2806 |
| 9,963,051 | B2 * | 5/2018 | Strong | B60N 2/26 |
| 10,086,722 | B2 * | 10/2018 | Denbo | B60N 2/2821 |
| 11,034,266 | B2 * | 6/2021 | Heisey | B60N 2/2848 |
| 11,117,498 | B2 * | 9/2021 | Strong | B60N 2/2863 |
| 11,491,897 | B2 * | 11/2022 | Strong | B60N 2/2863 |
| 12,139,054 | B2 * | 11/2024 | Sokhi | B60N 2/2839 |

* cited by examiner

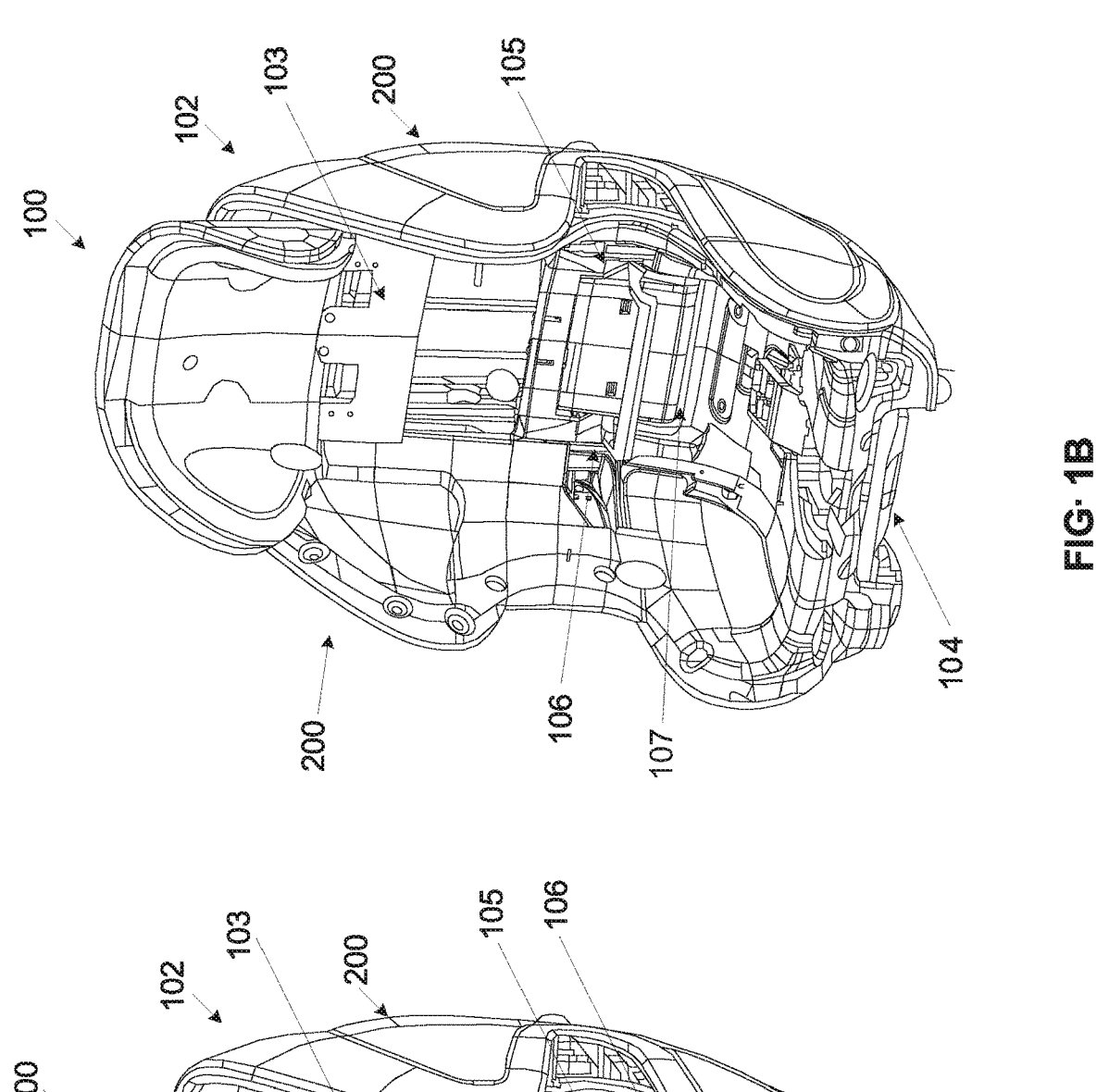
FIG· 1B
FIG· 1A

110

106

120

125

106

120

125

121

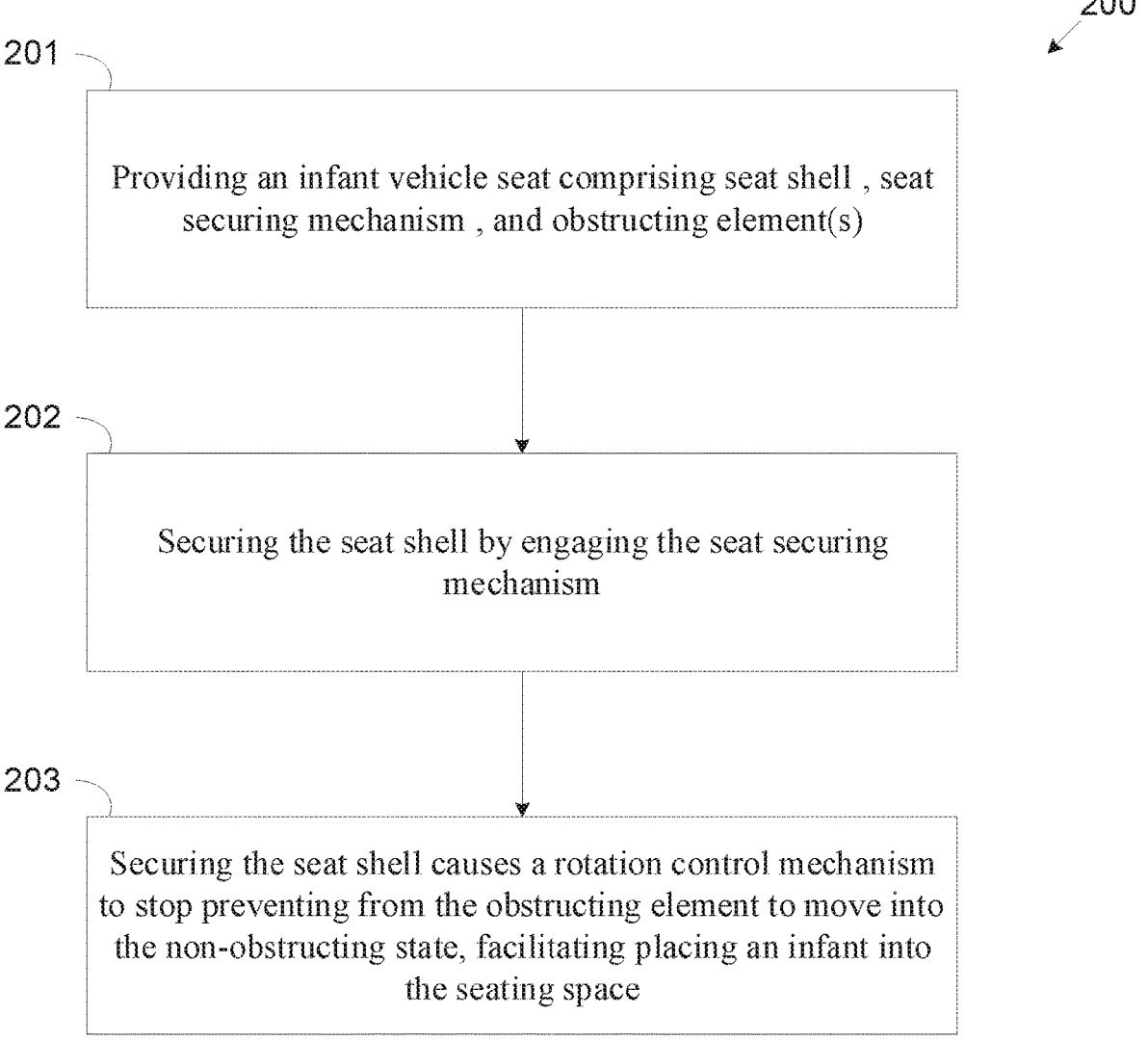

201

Providing an infant vehicle seat comprising seat shell , seat securing mechanism , and obstructing element(s)

202

Securing the seat shell by engaging the seat securing mechanism

203

Securing the seat shell causes a rotation control mechanism to stop preventing from the obstructing element to move into the non-obstructing state, facilitating placing an infant into the seating space

CAR SEAT WITH OBSTRUCTING ELEMENT

RELATED APPLICATION

This application claims the benefit of priority under 35 USC § 119(e) of U.S. Provisional Patent Application No. 63/422,458 filed on Nov. 4, 2022, the contents of which are incorporated by reference as if fully set forth herein in their entirety.

FIELD AND BACKGROUND OF THE INVENTION

The present disclosure relates generally to car seats or systems and more particularly to a car seat or children seat or system with tools to prevent use of the seat unless properly secured to a docking device. A car seat may be an infant seat, convertible seat, child seat and/or a booster seat.

Car seats are designed to securely restrain a child within a vehicle. The seats are secured to the vehicle's seat or to designated docking device such as seat bases which are connected to the vehicle using either the vehicle's seat belt or rigid latch connectors known as Lower Anchors and Tethers for Children (LATCH). It is critical that the car seat be properly secured to the vehicle's seat or to the designated docking device to ensure the infant's safety in the event of a collision or sudden stop. However, parents and caregivers may inadvertently fail to properly secure the car seat, subjecting the infant to potential injury.

SUMMARY OF THE INVENTION

The present disclosure provides a car seat or system with an obstructing element that obstructs seating of an infant unless the seat is properly secured to a docking device attached to the vehicle seat. The obstructing element is synchronized with an operation a seat securing mechanism that secures the seat shell to the docking device, for example mechanically connected thereto. The obstructing element is movable between an obstructing state, in which it protrudes into the seating space to obstruct seating of a child or an infant, and for instance 25 millimeters or more, a non-obstructing state, in which it is angled away from the seating space to allow infant seating. The obstructing element is prevented from moving out of the obstructing state when the seat securing mechanism is not securing the seat shell to the docking device. This ensures the seat cannot be used unless properly secured to the vehicle. The obstructing element can be located in the back of the seat, protruding into the back or in the lower area protruding into the buttocks area/seating area or in the head area.

According to some embodiments of the present invention there is provided a car seat configured to be securable to a docking device, comprising a seat shell formed around at least part of a seating space, a seat securing mechanism adapted to secure the seat shell to the docking device in a secure state and release the seat shell from the docking device in a release state, a rotation control mechanism synchronized with the seat securing mechanism and an obstructing element. The rotation control mechanism is adapted to prevent rotating the obstructing element between an obstructing state and a non-obstructing state when the seat securing mechanism is not in the secure state. In the obstructing state the obstructing element protrudes into the seating space for obstructing seating of an infant and in the non-obstructing state the obstructing element is angled towards a surface of the seat shell.

Optionally, the obstructing element protrudes at least 25 millimeters into the seating space in an obstructing state.

Optionally, the seat comprises a niche formed in the seat shell; wherein in the non-obstructing state the obstructing element is angled towards or into the niche.

Optionally, the obstructing element is mounted in a rotatable manner on a backrest of the seat shell.

Optionally, the seat comprises a flap mounted to rotate with the obstructing element so as to add seating interference when the obstructing element is in the obstructing state.

Optionally, the seating shell has a curvilinear form.

More optionally, in the non-obstructing state the obstructing element is further angled into a niche in the backrest.

Optionally, the obstructing element comprising a handle pivoting about at least one hinge pin mechanically connected to the seat shell.

More optionally, the handle comprising two arms connecting the handle to the at least one hinge pin.

Optionally, the obstructing element having a proximal end and a distal end wherein the proximal end having a tubular element pivoting about an axis and having a lateral recess formed at a peripheral surface thereof; wherein the lateral recess is adapted to be threaded with a movable pin; wherein a movement of the movable pin is blocked when the seat securing mechanism is securing the seat shell to the docking device.

More optionally, the movement of the movable pin is blocked by a blocking flange moved by when the seat securing mechanism switches between the secure state and the release state More optionally, the seat further comprises cushioning having an opening for allowing a user to angle the handle between the obstructing state and the non-obstructing state.

More optionally, the seat further comprises the handle having at least two tubular elements pivoting about the at least one hinge pin.

Optionally, the seat securing mechanism is mechanically connected to relocate a blocking flange using one or more cables from preventing the rotating of the obstructing element between the obstructing state and the non-obstructing state to facilitating the rotating of the obstructing element between the obstructing state and the non-obstructing state.

Optionally, the seat comprises a flap adapted to be angled above the obstructing element.

Optionally, the docking station may be detachable from and attachable to a vehicle seat.

Optionally, the rotation control mechanism is mechanically connected to the seat securing mechanism.

According to some embodiments of the present invention there is provided method of operating an car seat secured to a docking device, the method comprises providing an car seat comprising a seat shell, a seat securing mechanism to secure the seat shell to the docking device, an element moving when the seat is secured in the vehicle and an obstructing element, wherein the obstructing element is movable between an obstructing state protruding into a seating space of the seat shell and a non-obstructing state away from the seating space, and securing the seat shell to the docking device such that the seat securing mechanism engages the docking device. The securing causes the rotation control mechanism to stop preventing from the obstructing element to move into the non-obstructing state, facilitating placing an infant into the seating space.

According to some embodiments of the present invention there is provided a car seat system comprising the car seat as described above and a docking device detachable from and attachable to a vehicle seat.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A and 1B are front perspective views of an car seat with an obstructing element in obstructing and non-obstructing states according to some embodiments of the present disclosure;

Figure 7A:
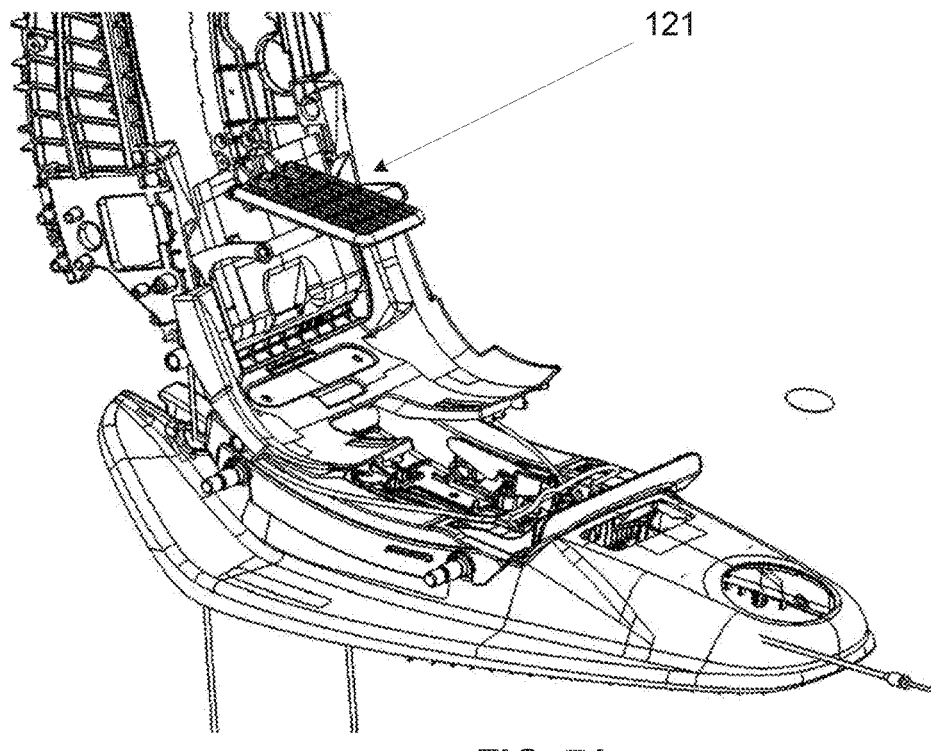
Figure 7B:
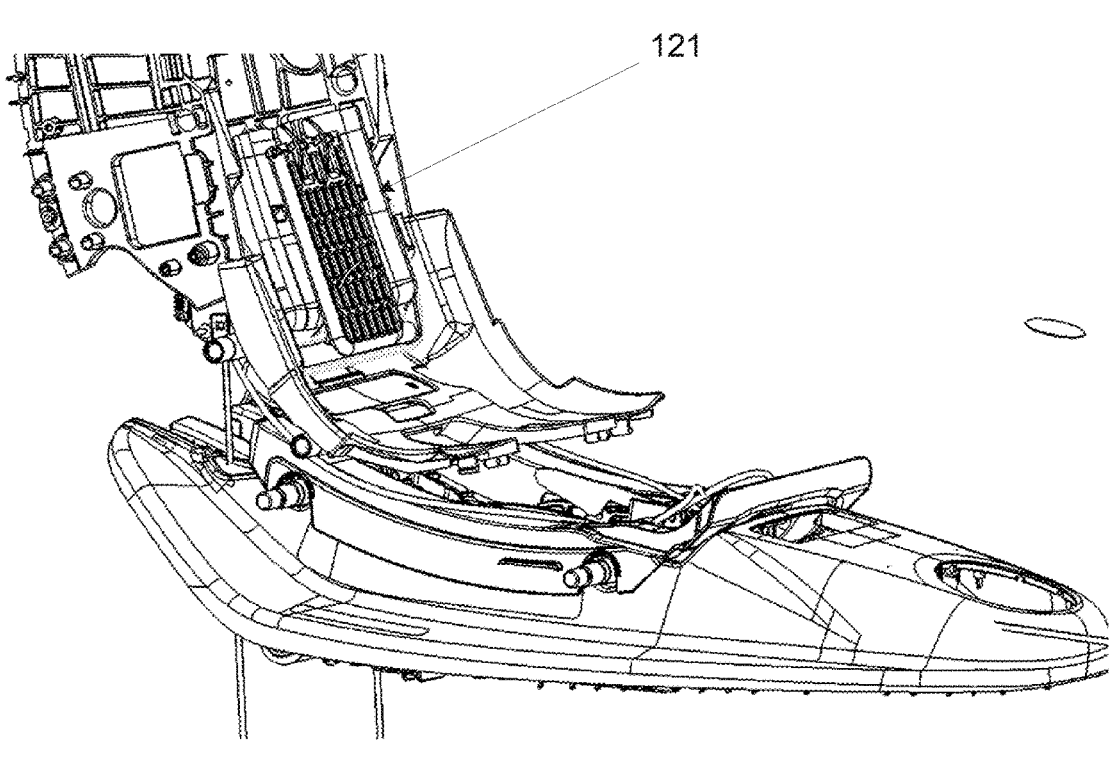

FIGS. 7A and 7B are schematic illustration of exemplary non flexible flap that either obstructs the placing of an infant in the seat spacing or falls or angled to allow placing of an infant in the seat spacing respectively, according to some embodiments of the present disclosure; and FIG. 8 is a flowchart of a method for securing an car seat, such as the seat depicted in FIGS. 1A and 1B, according to some embodiments of the present invention.

DESCRIPTION OF SPECIFIC EMBODIMENTS OF THE INVENTION

The present disclosure relates generally to car seats or systems and more particularly to an car seat or system with tools to prevent use of the seat unless properly secured to a docking device.

According to some embodiments of the present invention there is provided an car seat with an obstructing element that physically prevents seating an infant in the car seat when the car seat is not secured to the docking device. Other embodiments covers a system that includes both the car seat and the docking device which may be any commercial docking device used today or described in the art.

The obstructing element may be one or more handles, flanges, rods or any other elements that can be rotated from an obstructing state where the obstructing element protrudes into a seating space for obstructing the seating of the infant and to a non-obstructing state where the obstructing element is angled towards a surface of the seat shell, for instance the backrest, the lateral sides, the bottom, and/or the headrest. The rotation of the obstructing element is optionally controlled by a rotation control mechanism that is mechanically synchronized with a seat securing mechanism such that only when the seat securing mechanism secures the car to the docking device. The synchronization may be mechanical or electronical.

The seat securing mechanism may be any a mechanical system which provides assistance to the coupling and uncoupling of the car to the docking device.

The docking device may be any component for securing an infant car seat in a vehicle. The docking device is mechanically detachable and attachable from and to the car seat and include latches for connecting to vehicle anchors such as tether anchors or seat belt connectors for connecting to or using vehicle seat belts or any other means for connecting to the vehicle. The car seat bases often include features like a level indicator to achieve the correct recline angle and the correct attachment to the car seat.

The seat shell maybe monolithic or including multiple parts. The seat shell optionally has a curvilinear form around a seating space, for example includes curves or lines that are not straight. The obstructing element is optionally mounted to protrude the central seating area, for instance at the lower part of the backrest, for instance in a niche formed in the backrest. The obstructing element may be in other parts, for instance in the lateral sides, the bottom, and/or the headrest.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIGS. 1A and 1B illustrate a front perspective view of a car seat 100 with an obstructing element in obstructing and non-obstructing states according to some embodiments of the present disclosure. The car seat 100 is configured to be detachably secured to a docking device, which in turn can be secured to a vehicle seat, for instance using the vehicle's seat belt or LATCH anchors.

The car seat 100 includes a seat shell 102 curved or otherwise shaped around at least a portion of a seating space sized to accommodate an infant in a rear-facing orientation or a front facing orientation. A backrest 103 optionally includes a cutout or niche 107 formed to provide additional space for positioning an obstruction element 106 as described below. The niche may be formed in any other area of the seat.

As shown in FIG. 1B, the obstructing element 106 is in an obstructing state in which it protrudes into the seating space, thereby obstructing seating of an infant. The obstructing element 106 acts to prevent use of the seat 100 unless it is properly secured to the docking device. The obstructing element 106 may protrude for instance 25 millimeters or more into the seating space, for instance 27, 29, 31, 35 and 40 millimeters into the seating space.

FIG. 1A illustrates the car seat 100 with the obstructing element 106 in a non-obstructing state. In the non-obstructing state, the obstructing element 106 is angled into the niche 107 in the backrest 103 such that it no longer obstructs the seating space. This allows an infant to be seated into the seat 100.

As shown in FIGS. 1A-1B, the obstructing element 106 is a handle that rotates about hinge pins (shown for example with reference numeral 109 in FIG. 3) at the back of the backrest 103. The obstructing element 106 is mechanically connected to a rotation control mechanism 105 that controls the rotation thereof as described below, for instance prevent or allow the rotation thereof.

Figures 2A, 2B:
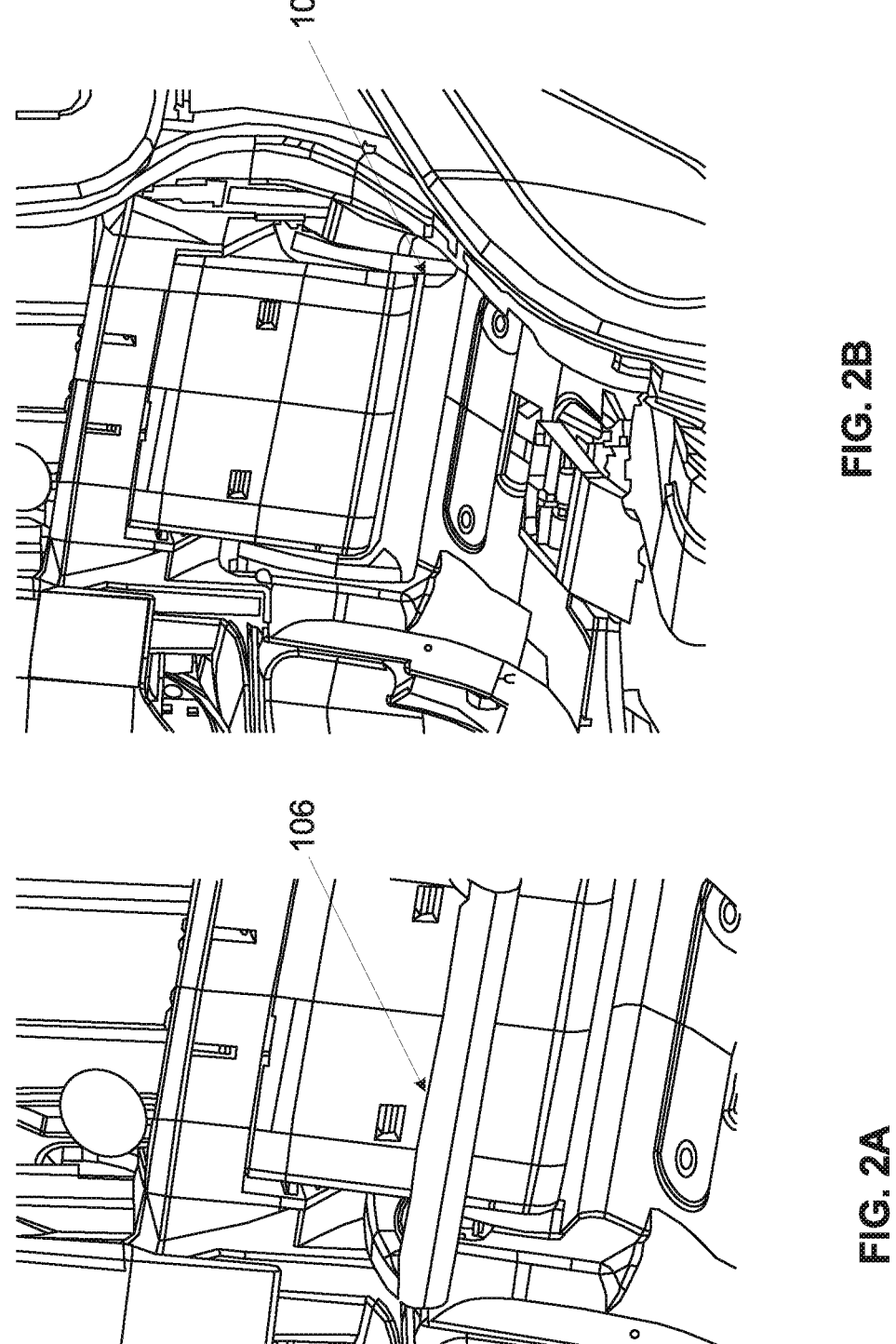
FIGS. 2A and 2B are exploded perspective views of an exemplary obstructing element, such as a handle, with an exemplary of the car seat in obstructing and non obstructing states according to some embodiments of the present disclosure.
Figure 2C:
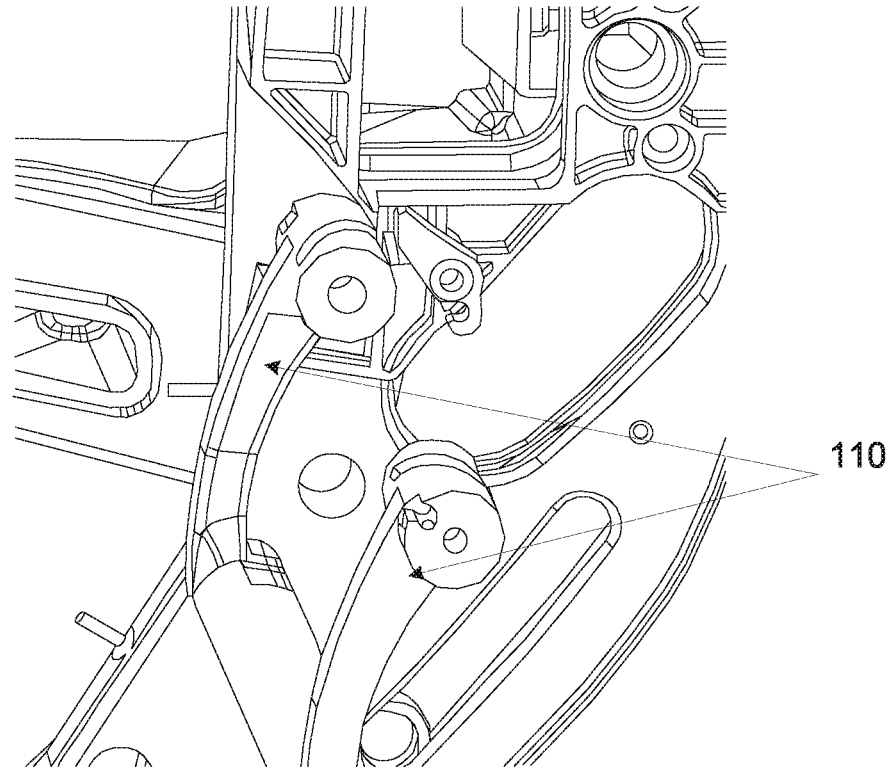
FIG. 2C is an exploded perspective view the handle with two arms, according to some embodiments of the present disclosure

Optionally, as shown at FIG. 2C, the handle 106 comprises two elongated arms 110 that connect the central grip portion of the handle 106 to hinge pins (described below) on either side of the backrest 103. The arms 110 rotate about the hinge pins to pivot the obstructing element 106 between states.

The handle 106 provides an easy means for a user to manually rotate the obstructing element 106 between the obstructing and non-obstructing states.

The seat shell 102 is optionally a plastic shell, optionally a composite plastic shell, or a carbon fiber shell formed with the backrest 103 and sidewalls 200 defining the seating space. Slots are formed in the sidewalls or the backrest to receive the hinge pins 109 and enable pivoting of the handle 106. A seat securing mechanism 104 is positioned at a rear side of the backrest 103 and/or a bottom side of the seat shell 102 to allow securing the seat shell 102 to the docketing device in a locked optionally fixed manner.

It should be noted that although in this description the obstructing element is mounted to tilt at the backrest, it can be at the headrest, lateral sides, and/or bottom of the seat shell.

The seat securing mechanism 104 is adapted to secure the seat shell 102 to the docking device in a locked state and release the seat shell 102 from the docking device in an unlocked state. The seat securing mechanism 104 may comprise, for example, a latch or other fastening device adapted to mate to a corresponding element on the docking device.

The seat securing mechanism 104 may comprise any suitable means for detachably anchoring the seat shell 102 to the docking device.

In one embodiment, the seat securing mechanism 104 includes a latch or clamp assembly on the rear of the seat shell 102 that engages with anchor points or corresponding latches on the docking device. For example, the seat securing mechanism may latch over a crossbar or into slots on the docking device.

The latch/clamp mechanism may include a release handle or button that allows a user to quickly detach the seat shell 102 from the docking device when desired. Cables 120 connecting the release control to the latch/clamp mechanism enable remote actuation by the user.

In another embodiment, the seat securing mechanism 104 could comprise retractable anchor connectors that extend from the rear of the seat shell 102 into receptacles on the docking device. A powered mechanism could retract the anchors for release.

The seat securing mechanism 104 may also include an electronic sensor or detector that verifies when the seat shell 102 is fully engaged with the docking device in the locked state. This sensor could provide a secondary check that the seat is properly secured.

In all cases, the seat securing mechanism 104 should provide a robust, secure connection to the docking device while allowing convenient detachment by the user when needed. Integration with the rotation control mechanism 105 ensures the seat is only usable when properly locked.

It should be noted that existing car may rely on visual or audible indicators to alert users if the seat is not properly secured to the vehicle. For example, a light or noise may activate if the seat is not locked into the docking device. However, such indicators can be ignored or fail to gain the user's attention. The present seat 100 provides a physical obstruction to use of the seat itself unless properly secured. This prevents the seat from being used at all if not properly installed.

The obstructing element 106 physically blocks access to the seating space when in the obstructing state. This is a much more salient deterrent against improper use than subtle visual or audible indicators. The obstructing element 106 is linked to the seat securing mechanism 104, so that the seat 100 cannot be used unless the shell 102 is properly secured to the docking device.

The protruding obstructing element 106 also provides an intuitive visual indicator that deters attempts to place a child in an improperly secured seat. It gives a clear physical cue that the seat 100 should not be used. This is a distinct advantage over existing seats with lights or sounds that could potentially be overlooked or disregarded by a user.

In conclusion, the obstructing element provides a unique advantage over existing seat placement indicators by physically preventing use of an car seat that is not properly secured. This makes improper use of the seat practically impossible and ensures maximum safety for infants. The obstruction provides a simple yet effective visual deterrent against unsafe use.

Reference is also made to FIGS. 2A and 2B which illustrate an exploded perspective view of an exemplary obstructing element, such as the handle depicted and marked as 106, with an exemplary of the car seat 100 in obstructing and non-obstructing states according to some embodiments of the present disclosure. It should be noted that other obstructing elements may be used, such as rods, flanges, and other rotatable elements that can hinder the seating of an infant in an obstructing state.

Figure 3:
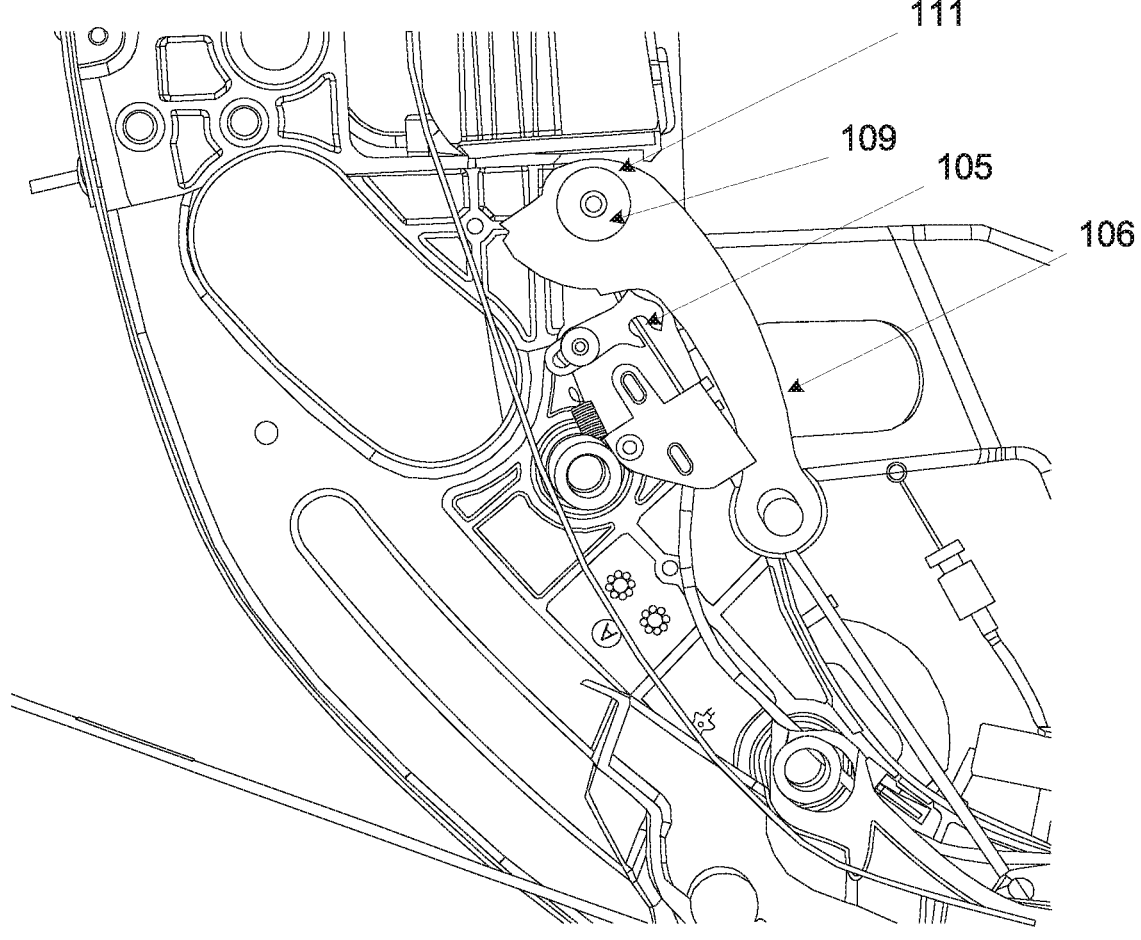
FIG. 3 is a close-up lateral perspective view of the obstructing element in a non-obstructing state, according to some embodiments of the present disclosure.
Figures 4A, 4B:
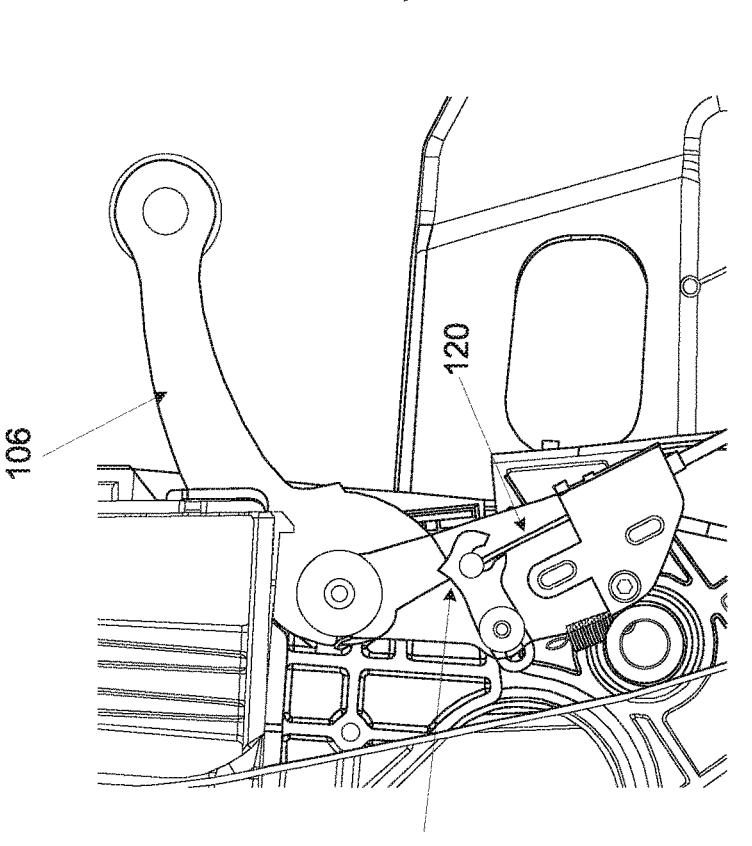
FIGS. 4A and 4B are schematic illustrations of a close-up lateral perspective view of an assembly of the rotation control mechanism and the obstructing element respectively in obstructing state and non-obstructing state, according to some embodiments of the present disclosure.

Reference is now also made to FIG. 3 which illustrates a close-up lateral perspective view of the obstructing element 106 in a non-obstructing state and the rotation control mechanism 105 and to FIGS. 4A and 4B which are schematic illustrations of a close-up lateral perspective view of the obstructing element 106 respectively in obstructing state and non-obstructing state.

The rotation control mechanism 105 is mechanically synchronized with, for example connected to, the seat securing mechanism 104 such that it prevents the obstructing element 106 from rotating when the seat securing mechanism 104 is in the unlocked state. This prevents use of the seat 100 unless properly secured to the docking device. The rotation control mechanism 105 maybe implemented using movable flanges or other mechanical barriers which are actuated in dependency of the seat securing mechanism state.

As depicted in FIG. 3 the obstructing element 106 includes a tubular or a circular element 111 at its proximal end that pivots about hinge pin 109. The rotation control mechanism 105 has a blocking flange 125 for preventing and allowing the rotation of the obstructing element 106. This exemplary rotation control mechanism 105 is further depicted in FIGS. 4A and 4B which depict an embodiment wherein the seat securing mechanism 104 utilizes one or more cables 120 and other mechanical elements to translate the locking movement to reposition the blocking flange 125 of the rotation control mechanism 105. The cables 120 are connected to synchronize the seat securing mechanical with the rotation control mechanism 105 to coordinate the prevention of rotation to states when the seat shell 102 is not secured to the docking device. The blocking flange 125 may either be located to prevent or to allow the rotation of the rotational mechanism and therefore of the obstructing element 106. In FIG. 4A the blocking flange 125 is in a niche in the tubular or circular element 111, preventing from the obstructing element 106 to rotate and in FIG. 4B the blocking flange 125 is pulled outside of the niche in the tubular or circular element 111, allowing the obstructing element 106 to be angled toward the backrest. The figure also illustrates a biasing spring 116 and a pin holding the blocking flange 125 such that the spring maintains the blocking flange 125 engaged within the recess 112 when the blocking flange 125 is not pulled using the cable(s).

Figures 4C, 4D:
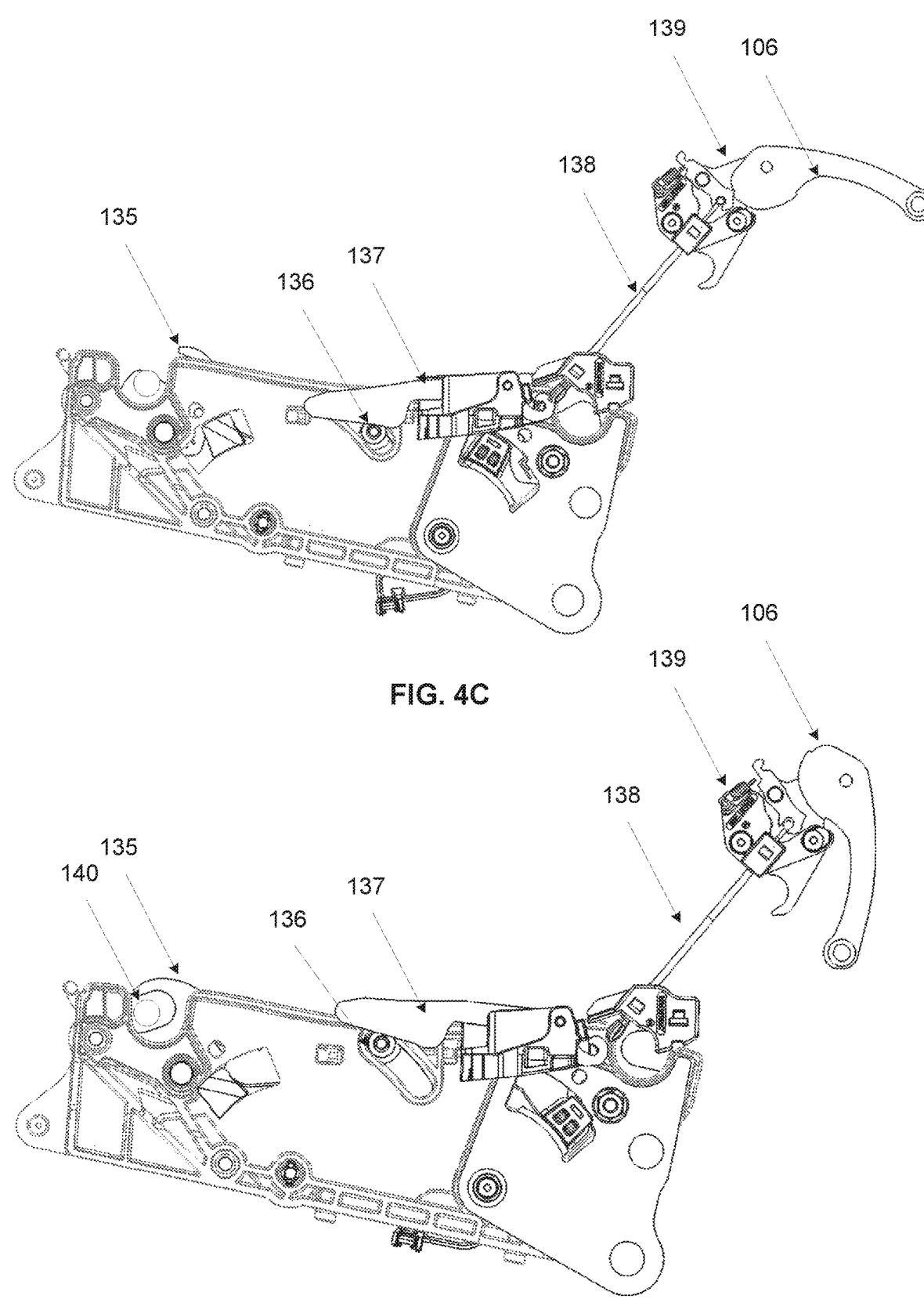
FIGS. 4C and 4D are lateral schematic illustrations of an assembly of the seat securing mechanism, an arm of the obstructing element, an assembly of the rotation control mechanism and the mechanical connection therebetween, according to some embodiments of the present invention.
Figure 4E:
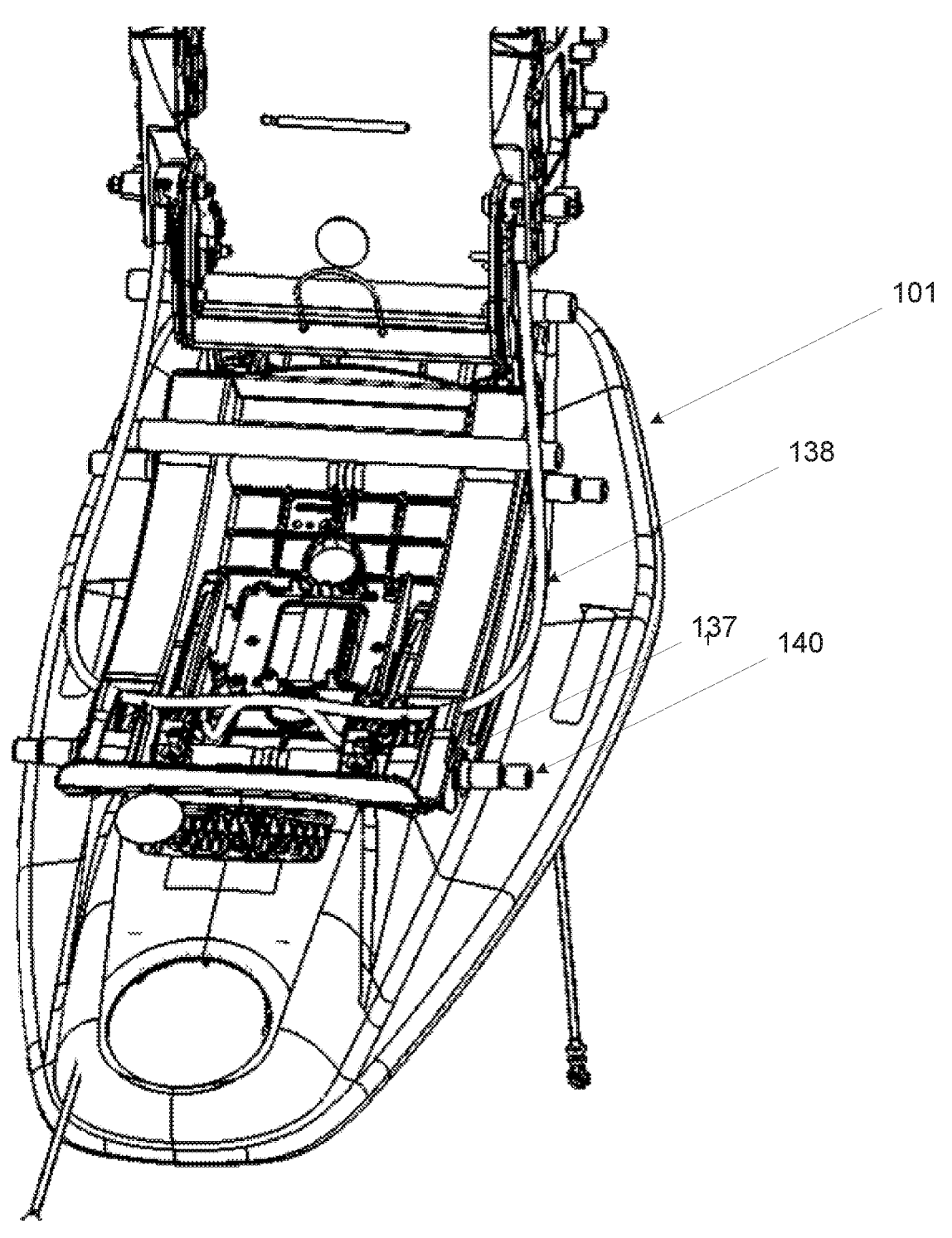
FIG. 4E is a schematic illustration of an exemplary docking device that provides the means for securing the car seat to the vehicle seat and an exemplary seat securing mechanism which is connected thereto, according to some embodiments of the present invention.
Figure 4F:
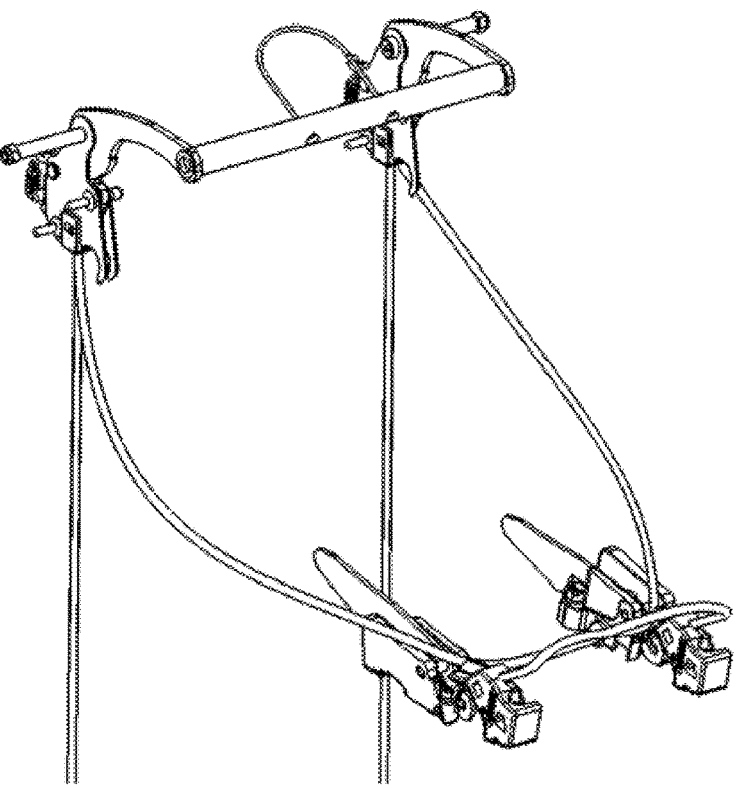
FIGS. 4F and 4G are schematic illustrations of a pair of assemblies of the seat securing mechanism, a pair of assemblies of the rotation control mechanism, the obstructing element, and cables used for mechanical connections, according to some embodiments of the present invention.
Figure 4G:
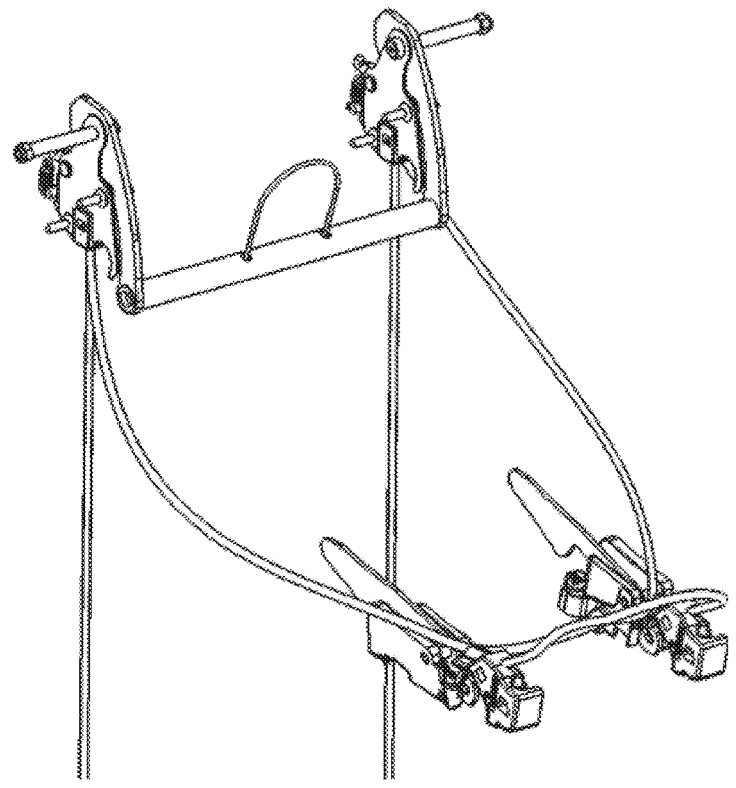
Figure 4H:
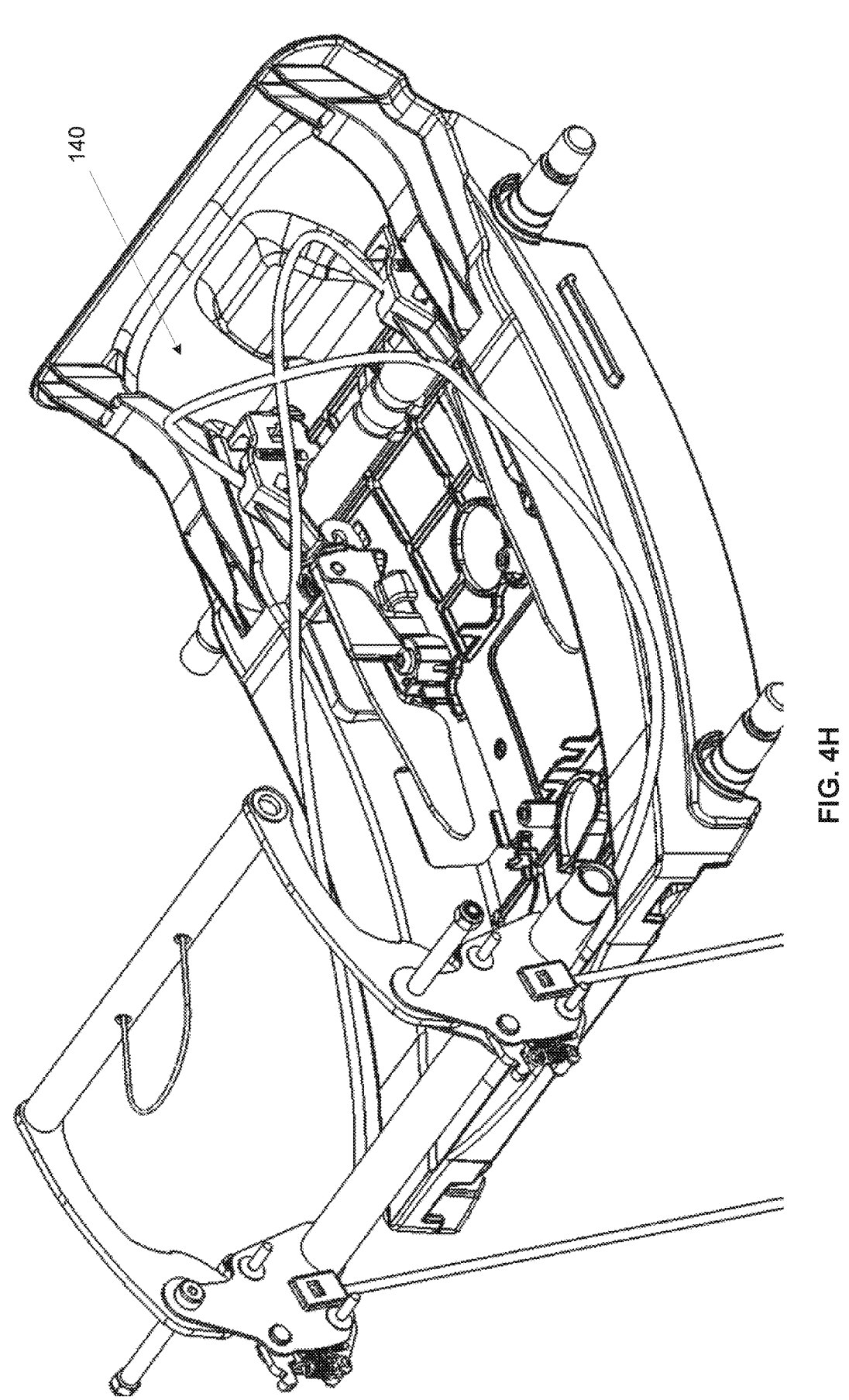
FIG. 4H is schematic illustration of an exemplary housing wherein the seat securing mechanism and the rotation control mechanism are mounted, according to some embodiments of the present invention.

Reference is now also made to FIGS. 4C and 4D which are lateral perspective views which respectively depicts how the state of each assembly out of a pair of assemblies of the seat securing mechanism 104 effects the obstructing element 106, according to some embodiments of the present invention. Each of these figures depicts one assembly out of the pair of assemblies of the seat securing mechanism 104, one assembly out of the pair of assemblies of the rotation control mechanism 105 and one of the arms of the obstructing element 106, and the mechanical connection between the assemblies in one side. FIGS. 4F and 4G are schematic illustrations of a pair of assemblies of the seat securing mechanism 104, a pair of assemblies of the rotation control mechanism 105, the obstructing element 106 as a whole and the cables connecting therebetween. In the respective vehicle seat, each assembly of a pair is fixated opposite to the location of the other assembly of that pair, as depicted in FIGS. 4E-4G. For example, as shown at FIG. 4H the fixation is assured using a housing 150 designed to be mounted at the bottom of the car seat shell. The housing 150 maybe made out of reinforced plastics, composites, and/or metals. The housing may be a portion of a monolithic seat shell.

With reference to FIGS. 4C and 4D, the operation of each assembly of the locking mechanism 104 to control the obstructing element 106 is shown.

In FIG. 4C, a latch 135 used to secure the car seat 100 to the docking device 101 is in an open, unlocked state. A pin 136 connected to the latch 135 via a cable is released downwards in this state. This slack in the cable fails to pull on a connected arm 137. The pin 136 is connected to the securing mechanism (but it is not the mechanism itself) and only when the seat is secured, it moves the arm (137) to engage the other mechanisms as described below.

The loose cable 138 is unable to overcome the force of a spring 139 that pushes the blocking flange 125 upward into the path of the obstructing element 106. This holds the obstructing element 106 in the obstructing state protruding into the seating space.

In FIG. 4D, the latch 135 is shown in a closed, locked state securing the car seat 100 to a rod 140 on the docking device. This moves pin 136 upward, pushing up the connected arm 137.

Cable 138 is now stretched tight by the arm to overcome the force of spring 139. The blocking flange 125 is retracted downward away from the obstructing element 106. This allows the obstructing element 106 to rotate down into the non-obstructing state for use of the seat 100.

Thus, the state of the latch 135 determines the position of the blocking flange 125 via the mechanical linkage, thereby controlling the obstructing element 106 based on whether the seat is properly secured to the docking device. While the docking device may also understood as one or more docking elements of the vehicle, such as lower anchors and tethers for children (LATCH) system connectors, reference is now made to a description of a detachable docking device that can be detached from the vehicle.

The assemblies depicted in FIGS. 4F and 4G are mechanically synchronized using a cable or another mechanical connection that connect therebetween. Reference is also made to FIG. 4E which is describes an exemplary docking device 101 that provides the means for securing the car seat to the vehicle seat. The docking device 101 may serve as an intermediate attachment between the seat shell 102 and the vehicle seat. The docking device 101 may comprise a rigid or semi-rigid base sized to conform to the vehicle seat cushion. The base is sturdy enough to bear the weight and forces of the seat shell 102 and infant occupant. Example materials for the docking device 101 base include reinforced plastics, composites, or metals. The base may include indentations or contours to fit around seat belt buckles or anchors on the vehicle seat. The docking device 101 may also include engagement points for the securing mechanism 104 on the seat shell 102. This may include a crossbar, rod 140, slots, or receptacles to receive latches or anchor connectors from the seat shell 102 (e.g. see FIGS. 4C-4D).

The underside of the docking device 101 may further include attachments for securing the docking device 101 to the vehicle seat. For example, latches or connectors may be provided to engage with seat belt straps or LATCH anchors built into the vehicle seat. In one embodiment, the docking device 101 is rigidly attached to the vehicle seat using the LATCH anchors or seat belt once installed. The seat shell 102 can then be selectively engaged and released as needed.

The docking device 101 provides a robust foundation for the car seat 100 and a standardized interface for securing the seat shell 102 to a wide range of vehicle seats. The detachable nature allows convenient transition from vehicle use to a stroller configuration.

As described previously, the rotation control mechanism 105 in the disclosed embodiment utilizes the blocking flange 115 to prevent rotation of the obstructing element 106 when the seat is not properly secured. The blocking flange 115 physically obstructs movement of the movable pin 114, locking the obstructing element 106 in place.

However, alternative mechanisms could be utilized to block rotation of the obstructing element 106. For example, instead of a flange, a protruding knob or strut could impede the path of pin 114. A hinged lever arm could be pivoted into the path of pin 114 by the seat securing mechanism 104.

In another approach, the pin 114 could be displaced laterally or vertically out of engagement with the recess 112 of the tubular element 111 when the seat is not secured. A spring would hold pin 114 in the disengaged position. The seat securing mechanism 104 would shift the pin 114 back into engagement with the recess 112 only when the seat is properly installed, allowing rotation.

As another example, the tubular element 111 could include a notch or channel that matches up with a spindle when rotated into the non-obstructing state. In the obstructing state, the notch is rotated out of alignment, and the spindle jams against the periphery of the tubular element 111, preventing further rotation.

In each case, a mechanical obstruction is selectively moved to either block or permit rotation of the obstructing element 106 dependent on the state of the seat securing mechanism 104. This reliably ties the obstructing functionality to proper seat installation for safety.

Figure 5B:
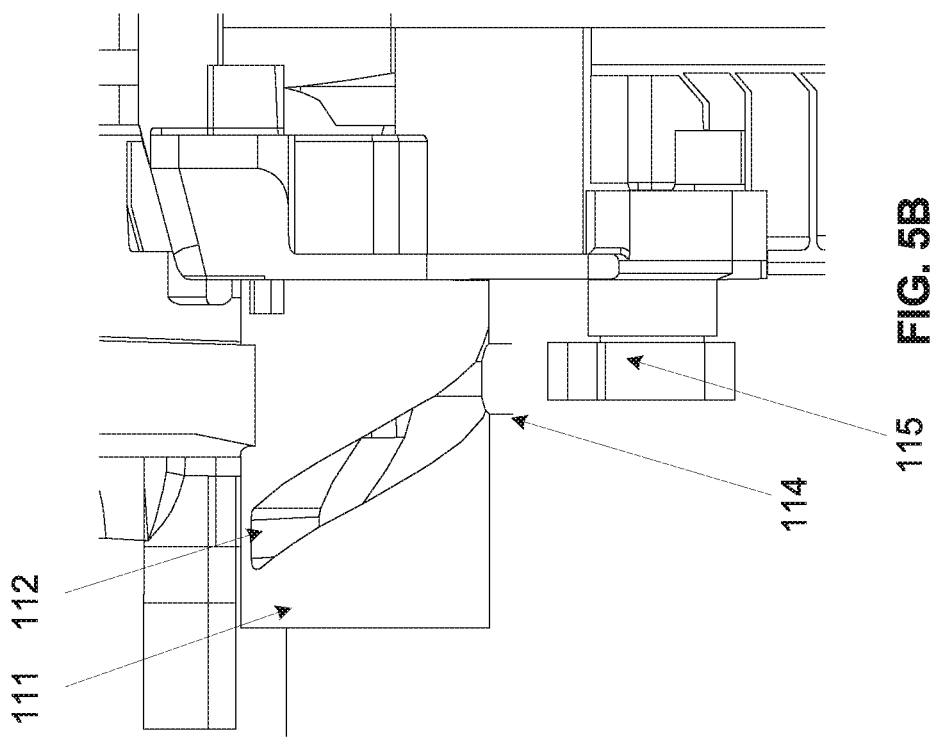
FIGS. 5A and 5B are schematic illustrations of a proximal end of an arm of a handle which functions as the described obstructing element and having on the tubular element and a recess, according to some embodiments of the present disclosure.
Figure 5A:
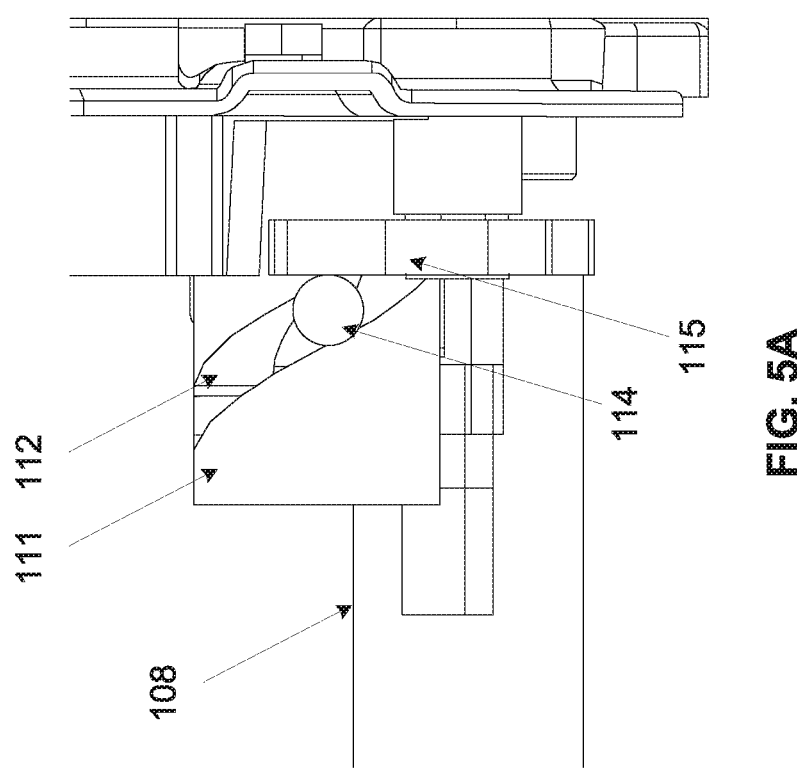

Reference is now also made to FIGS. 5A and 5B which are schematic illustrations of a proximal end of an arm of an exemplary obstructing element, such as 106, having on the tubular element 111 a recess 112, according to some embodiments of the present invention. In such embodiments a proximal end of a left arm of the exemplary obstructing element is has a mirrored shape in relation to a proximal end of a right arm of the exemplary obstructing element. Applicant assumes that depiction of one arm is therefore identical to the teaching of the other.

The recess 112 is formed in its peripheral surface, for instance diagonally. The obstructing element 106 has a proximal end adjacent the hinge pins 109 and a distal end positioned within the seating space. The tubular element 111 is located at the proximal end and pivots about a hinge pin 109. The recess 112 is formed in the peripheral surface 113 of the tubular element 111 and is adapted to be threaded by the movable pin 114. The movable pin 114 extends through the recess 112 and engages the seat securing mechanism 104. When the seat securing mechanism 104 is in the unlocked state, as shown at FIG. 5A, a blocking flange 115 is positioned in the rotational path of the pin 114. This prevents the obstructing element 106 from rotating between the obstructing and non-obstructing states.

When the seat securing mechanism 104 is moved to the locked state securing the seat shell 102 to the docking device, the blocking flange 115, as shown at FIG. 5B, is repositioned away from the pin 114. This allows the obstructing element 106 to be rotated between the obstructing and non-obstructing states, allowing seating an infant in the seat.

Figure 6:
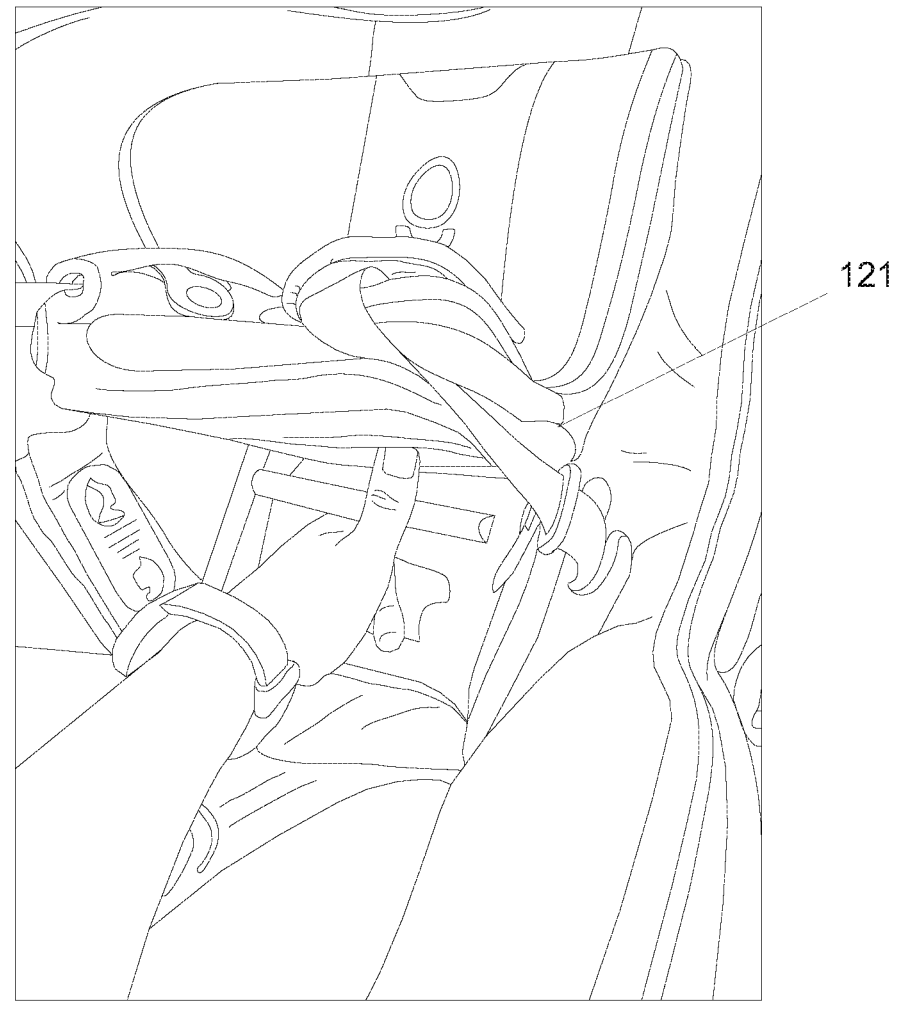
FIG. 6 is an image of cushioning material which cover the obstructing element 106, according to some embodiments of the present disclosure.

As shown at the image provided as FIG. 6, the car seat 100 may additionally include cushioning material 116 which cover the obstructing element 106 to prevent pinching of or injury to an infant. The cushioning material 116 may comprise foam, fabric, or similar materials that covers the obstructing element 106. The cushioning 116 optionally includes an opening 117 that allows user access to grip the handle 106 and rotate the obstructing element 106 between states.

Optionally, a flap 121 is provided to increase the interference caused by the obstructing element 106 when in the non-obstructing state and optionally to cover it in a non-obstructing state. Opening 117 allows user access to the handle 106.

FIGS. 7A and 7B depicts exemplary non flexible flap, for instance from plastic or a composite plastic that either obstructs the placing of an infant in the seat spacing or falls or angled to allow placing of an infant in the seat spacing respectively.

While the disclosed embodiment utilizes a pivoting handle 106 as the obstructing element 106, various alternative obstruction elements could be employed to physically block access to the seating space when in the obstructing state.

For example, the obstructing element could comprise a sliding panel or flap that retracts into the side or top of the backrest 103 in the non-obstructing state. One or more padded arms could fold out from the sides of the backrest 103 and meet in the middle to obstruct seating when in the obstructing state.

In another approach, the obstructing element could be an inflatable bladder that inflates to fill the seating space when the seat is not properly secured. Deflating the bladder would allow use of the seat. The bladder could be incorporated into the existing cushioning material 116 on the seat.

Instead of a pivoting handle, a linear obstructing element could translate in and out of the backrest 103. For example, a padded bar could slide vertically up and down, or a flexible rod could extend horizontally to block access. The element could retract into a recess in the backrest 103 when not in use.

In each case, the obstruction element should physically impede placement of an infant when in the obstructing state. Integration with the seat securing mechanism 104 prevents switching to the non-obstructing state unless the seat 100 is properly installed. The specific obstruction design can vary, provided it functionally blocks improper seat use.

Reference is now made to FIG. 8 which is a flowchart of a method for securing an car seat, such as 100 to a docking device, according to some embodiments of the present invention. As shown at 201 the method begins by providing an car seat 100 comprising seat shell 102, seat securing mechanism 104, and obstructing element 106 as described above. Initially, the obstructing element 106 is in the obstructing state protruding into the seating space of seat shell 102. This prevents infant seating and visual indicates the seat 100 should not be used. Now, as shown at 202, the seat shell 102 is then secured to the docking device 101 by engaging the seat securing mechanism 104 with a corresponding mechanism on the docking device. This may comprise inserting anchoring connectors into the docking device 101 or latching the seat shell 102 into designated place.

Now, as shown at 203, when securing the seat shell 102 the seat securing mechanism 104 causes the rotation control mechanism 105 to stop preventing from the obstructing element 106 to move into the non-obstructing state, facilitating placing an infant into the seating space, for instance as described above. For instance, this causes reposition the blocking flange 115 away from the path of the movable pin 114 which is mechanically connected to the obstructing element 106. This removes the obstruction preventing rotation of the obstructing element 106. With the blocking flange 115 moved out of the way, the obstructing element 106 can be moved into the non-obstructing state angled away from the seating space. With the obstructing element 106 in the non-obstructing state, an infant can be safely placed into the seating space of the seat shell 102. The seat 100 is now properly secured and ready for use.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

It is expected that during the life of a patent maturing from this application many relevant locking and rotational mechanisms will be developed and the scope of the terms locking and rotational mechanisms is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

12

What is claimed is:

1. A car seat configured to be securable to a docking device, comprising:
   a seat shell formed around at least part of a seating space;
   a seat securing mechanism adapted to secure the seat shell to the docking device in a secure state and release the seat shell from the docking device in a release state;
   a rotation control mechanism synchronized with the seat securing mechanism; and
   an obstructing element;
   wherein the rotation control mechanism is adapted to prevent rotating the obstructing element between an obstructing state and a non-obstructing state when the seat securing mechanism is not in the secure state;
   wherein in the obstructing state the obstructing element protrudes into the seating space for obstructing seating of an infant and in the non-obstructing state the obstructing element is angled towards a surface of the seat shell.

2. The car seat of claim 1, wherein the obstructing element protrudes at least 25 millimeters into the seating space in an obstructing state.

3. The car seat of claim 1, further comprising a niche formed in the seat shell; wherein in the non-obstructing state the obstructing element is angled towards or into the niche.

4. The car seat of claim 1, wherein the obstructing element is mounted in a rotatable manner on a backrest of the seat shell.

5. The car seat of claim 4, wherein in the non-obstructing state the obstructing element is further angled into a niche in the backrest.

6. The car seat of claim 1, further comprising a flap mounted to rotate with the obstructing element so as to add seating interference when the obstructing element is in the obstructing state.

7. The car seat of claim 1, wherein the seating shell has a curvilinear form.

8. The car seat of claim 1, wherein the obstructing element comprises a handle pivoting about at least one hinge pin mechanically connected to the seat shell.

9. The car seat of claim 8, further comprising cushioning having an opening for allowing a user to angle the handle between the obstructing state and the non-obstructing state.

10. The car seat of claim 8,
    wherein the handle has at least two tubular elements pivoting about the at least one hinge pin.

11. The car seat of claim 8, wherein the handle comprises two arms connecting the handle to the at least one hinge pin.

12. The car seat of claim 1, wherein the obstructing element has a proximal end and a distal end, wherein the proximal end has a tubular element pivoting about an axis and having a lateral recess formed at a peripheral surface thereof; wherein the lateral recess is adapted to be threaded with a movable pin; wherein a movement of the movable pin is blocked when the seat securing mechanism is securing the seat shell to the docking device.

13. The car seat of claim 12, wherein the movement of the movable pin is blocked by a blocking flange that is moved when the seat securing mechanism switches between the secure state and the release state.

14. The car seat of claim 1, wherein the seat securing mechanism is mechanically connected to relocate a blocking flange using one or more cables from preventing the rotating of the obstructing element between the obstructing state and the non-obstructing state to facilitating the rotating of the obstructing element between the obstructing state and the non-obstructing state.

15. The car seat of claim 1, further comprising a flap adapted to be angled above the obstructing element.

16. The car seat of claim 1, wherein the docking device is detachable from and attachable to a vehicle seat.

17. The car seat of claim 1, wherein the rotation control mechanism is mechanically connected to the seat securing mechanism.

18. A method of operating an car seat secured to a docking device, the method comprising:

providing a car seat comprising a seat shell, a seat securing mechanism to secure the seat shell to the docking device, an element moving when the seat is secured in the vehicle and an obstructing element, wherein the obstructing element is movable between an obstructing state protruding into a seating space of the seat shell and a non-obstructing state away from the seating space; and securing the seat shell to the docking device such that the seat securing mechanism engages the docking device, wherein the securing causes the rotation control mechanism to stop preventing movement of the obstructing element into the non-obstructing state, facilitating placing an infant into the seating space.

19. A car seat system comprising:

(a) a car seat configured to be securable to a docking device, the car seat comprises:

a seat shell formed around at least part of a seating space;

a seat securing mechanism adapted to secure the seat shell to the docking device in a secure state and release the seat shell from the docking device in a release state;

a rotation control mechanism synchronized with the seat securing mechanism; and an obstructing element;

wherein the rotation control mechanism is adapted to prevent rotating the obstructing element between an obstructing state and a non-obstructing state when the seat securing mechanism is not in the secure state;

wherein in the obstructing state the obstructing element protrudes into the seating space for obstructing seating of an infant and in the non-obstructing state the obstructing element is angled towards a surface of the seat shell; and (b) a docking device detachable from and attachable to a vehicle seat.

* * * * *